(12) United States Patent
Nishio

(10) Patent No.: US 6,774,909 B1
(45) Date of Patent: Aug. 10, 2004

(54) METHOD AND APPARATUS FOR TRANSFORMING COLOR IMAGE INTO MONOCHROMATIC IMAGE

(75) Inventor: Yoshiaki Nishio, Osaka (JP)

(73) Assignee: Keyence Corporation, Osaka (JP)

( * ) Notice: Subject to any disclaimer, the term of this patent is extended or adjusted under 35 U.S.C. 154(b) by 1000 days.

(21) Appl. No.: 09/598,994

(22) Filed: Jun. 22, 2000

(30) Foreign Application Priority Data

Jan. 19, 2000 (JP) .......................................  2000-011030

(51) Int. Cl.[7] ................................................. G09G 5/04
(52) U.S. Cl. ....................... 345/600; 345/593; 345/603; 358/515; 358/518; 382/162
(58) Field of Search ................................. 345/600, 589, 345/593, 597, 603, 604, 605, 690; 358/515, 518, 520, 521; 382/162, 165, 167

(56) References Cited

U.S. PATENT DOCUMENTS 5,187,570 A    2/1993  Hibi et al. ...................... 358/80
5,245,327 A  * 9/1993  Pleva et al. .................. 345/600
5,576,723 A  * 11/1996 Asprey ........................ 345/3.1
5,923,447 A    7/1999  Yamada ....................... 358/523

FOREIGN PATENT DOCUMENTS

DE    38 02 736 A1    1/1987
JP    11110552         4/1999

OTHER PUBLICATIONS

European Search Report for EP 00 11 3052.

* cited by examiner

Primary Examiner—Dennis-Doon Chow
(74) Attorney, Agent, or Firm—Kilyk & Bowersox, P.L.L.C.

(57) ABSTRACT

An image transforming method and an apparatus therefor utilizes an extent of color consistency which is defined by R, G and B values and at least one of the disparities of respective couples of R, G and B values of one or more designated picture elements of a color image, and transforms a color image to a monochrome image with picture elements having brightness values each of which is given by a total of deviations of the R, G and B values and at least one of the RB, RG and BG disparities from the extent of color consistency.

14 Claims, 15 Drawing Sheets

FIG. 2

| COLOR | WHITE | REDDISH | BLUISH | PURPLISH | REDDISH PURPLE |
|---|---|---|---|---|---|
| R : G : B | 1 : 1 : 1 | 2 : 1 : 1 | 1 : 1 : 2 | 2 : 1 : 2 | 3 : 1 : 2 |
| R | 50 | 100 | 50 | 100 | 150 |
| G | 50 | 50 | 50 | 50 | 50 |
| B | 50 | 50 | 100 | 100 | 100 |
| R | 50 | 100 | 50 | 100 | 150 |
| G | 50 | 50 | 50 | 50 | 50 |
| B | 50 | 50 | 100 | 100 | 100 |
| R | 50 | 100 | 50 | 100 | 150 |
| G | 50 | 50 | 50 | 50 | 50 |
| B | 50 | 50 | 100 | 100 | 100 |
| R | 50 | 100 | 50 | 100 | 150 |
| G | 50 | 50 | 50 | 50 | 50 |
| B | 50 | 50 | 100 | 100 | 100 |
| R | 50 | 100 | 50 | 100 | 150 |
| G | 50 | 50 | 50 | 50 | 50 |
| B | 50 | 50 | 100 | 100 | 100 |

| COLOR<br>R : G : B | WHITE<br>1 : 1 : 1 | | REDDISH<br>2 : 1 : 1 | | BLUISH<br>1 : 1 : 2 | | PURPLISH<br>2 : 1 : 2 | | REDDISH PURPLE<br>3 : 1 : 2 | |
|---|---|---|---|---|---|---|---|---|---|---|
| R | 70 | | 140 | | 70 | | 140 | | 210 | |
| G | 70 | | 70 | | 70 | | 70 | | 70 | |
| B | 70 | | 70 | | 100 | | 140 | | 140 | |
| R | 60 | | 120 | | 60 | | 120 | | 180 | |
| G | 60 | | 60 | | 60 | | 60 | | 60 | |
| B | 60 | | 60 | | 120 | | 120 | | 120 | |
| R | 50 | | 100 | | 50 | | 100 | | 150 | |
| G | 50 | | 50 | | 50 | | 50 | | 50 | |
| B | 50 | | 50 | | 100 | | 100 | | 100 | |
| R | 40 | | 80 | | 40 | | 80 | | 120 | |
| G | 40 | | 40 | | 40 | | 40 | | 40 | |
| B | 40 | | 40 | | 80 | | 80 | | 80 | |
| R | 30 | | 60 | | 30 | | 60 | | 90 | |
| G | 30 | | 30 | | 30 | | 30 | | 30 | |
| B | 30 | | 30 | | 60 | | 60 | | 60 | |

| COLOR<br>R:G:B | WHITE<br>1:1:1 | REDDISH<br>2:1:1 | BLUISH<br>1:1:2 | PURPLISH<br>2:1:2 | REDDISH PURPLE<br>3:1:2 |
|---|---|---|---|---|---|
| PR | 0 | 70 | 0 | 70 | 140 |
| PG | 0 | 0 | 0 | 0 | 0 |
| PB | 0 | 0 | 0 | 0 | 0 |
| PR B | 30 | 100 | 0 | 30 | 100 |
| V | 30 | 170 | 0 | 100 | 240 |
| PR | 0 | 50 | 0 | 50 | 110 |
| PG | 0 | 0 | 0 | 0 | 0 |
| PB | 0 | 0 | 0 | 0 | 0 |
| PR B | 30 | 90 | 0 | 30 | 90 |
| V | 30 | 140 | 0 | 80 | 200 |
| PR | 0 | 30 | 0 | 30 | 80 |
| PG | 0 | 0 | 0 | 0 | 0 |
| PB | 10 | 10 | 0 | 0 | 0 |
| PR B | 30 | 100 | 0 | 30 | 100 |
| V | 40 | 140 | 0 | 60 | 180 |
| PR | 0 | 10 | 0 | 10 | 50 |
| PG | 0 | 0 | 0 | 0 | 0 |
| PB | 20 | 20 | 0 | 0 | 0 |
| PR B | 30 | 70 | 0 | 30 | 70 |
| V | 50 | 100 | 0 | 40 | 120 |
| PR | 0 | 0 | 0 | 0 | 20 |
| PG | 0 | 0 | 0 | 0 | 0 |
| PB | 30 | 30 | 0 | 0 | 0 |
| PR B | 30 | 60 | 0 | 30 | 60 |
| V | 60 | 90 | 0 | 30 | 80 |

↘ 11a

EXTENT OF COLOR CONSISTENCY
FOR BLUISH COLUMN

| COLOR | | WHITE | REDDISH | BLUISH | PURPLISH | REDDISH PURPLE |
|---|---|---|---|---|---|---|
| R : G : B | | 1:1:1 | 2:1:1 | 1:1:2 | 2:1:2 | 3:1:2 |
| R | | 70 | 140 | 70 | 140 | 210 |
| G | | 70 | 70 | 70 | 70 | 70 |
| B | | 70 | 70 | 100 | 140 | 140 |
| R | | 60 | 120 | 60 | 120 | 180 |
| G | | 60 | 60 | 60 | 60 | 60 |
| B | | 60 | 60 | 120 | 120 | 120 |
| R | | 50 | 100 | 50 | 100 | 150 |
| G | | 50 | 50 | 50 | 50 | 50 |
| B | | 50 | 50 | 100 | 100 | 100 |
| R | | 40 | 80 | 40 | 80 | 120 |
| G | | 40 | 40 | 40 | 40 | 40 |
| B | | 40 | 40 | 80 | 80 | 80 |
| R | | 30 | 60 | 30 | 60 | 90 |
| G | | 30 | 30 | 30 | 30 | 30 |
| B | | 30 | 30 | 60 | 60 | 60 |

EXTENT OF COLOR CONSISTENCY
FOR BLUEISH COLUMN

| | | |
|---|---|---|
| R | 30 | 70 |
| G | 30 | 70 |
| B | 60 | 140 |

| COLOR<br>R:G:B | WHITE<br>1:1:1 | REDDISH<br>2:1:1 | BLUISH<br>1:1:2 | PURPLISH<br>2:1:2 | REDDISH PURPLE<br>3:1:2 |
|---|---|---|---|---|---|
| PR | 0 | 0 | 0 | 0 | 70 |
| PG | 0 | 0 | 0 | 0 | 0 |
| PB | 0 | 0 | 0 | 0 | 0 |
| PRB | 0 | 70 | 70 | 0 | 70 |
| V | 0 | 70 | 70 | 0 | 140 |
| PR | 0 | 0 | 0 | 0 | 40 |
| PG | 0 | 0 | 0 | 0 | 0 |
| PB | 0 | 0 | 0 | 0 | 0 |
| PRB | 0 | 60 | 60 | 0 | 60 |
| V | 0 | 60 | 60 | 0 | 100 |
| PR | 10 | 0 | 10 | 0 | 10 |
| PG | 0 | 0 | 0 | 0 | 0 |
| PB | 10 | 10 | 10 | 0 | 0 |
| PRB | 0 | 50 | 50 | 0 | 50 |
| V | 20 | 60 | 60 | 0 | 60 |
| PR | 20 | 0 | 20 | 0 | 0 |
| PG | 0 | 0 | 0 | 0 | 0 |
| PB | 20 | 20 | 0 | 0 | 0 |
| PRB | 0 | 40 | 40 | 0 | 40 |
| V | 40 | 60 | 60 | 0 | 40 |
| PR | 30 | 0 | 30 | 0 | 0 |
| PG | 0 | 0 | 0 | 0 | 0 |
| PB | 30 | 30 | 0 | 0 | 0 |
| PRB | 0 | 30 | 30 | 0 | 30 |
| V | 60 | 60 | 60 | 0 | 30 |

EXTENT OF COLOR CONSISTENCY 11a
FOR BLUISH COLUMN

| | | |
|---|---|---|
| R | 60 | 140 |
| G | 30 | 70 |
| B | 60 | 140 |
| RB | 0 | 0 |

FIG. 9

| COLOR<br>R : G : B | WHITE<br>1 : 1 : 1 | REDDISH<br>2 : 1 : 1 | BLUISH<br>1 : 1 : 2 | PURPLISH<br>2 : 1 : 2 | REDDISH PURPLE<br>3 : 1 : 2 |
|---|---|---|---|---|---|
| PR  | 10  | 20  | 10  | 20 | 90  |
| PG  | 10  | 10  | 10  | 10 | 10  |
| PB  | 10  | 10  | 20  | 20 | 20  |
| PRB | 0   | 70  | 70  | 0  | 70  |
| V   | 30  | 110 | 110 | 50 | 190 |
| PR  | 20  | 0   | 20  | 0  | 60  |
| PG  | 0   | 0   | 0   | 0  | 0   |
| PB  | 20  | 20  | 0   | 0  | 0   |
| PRB | 0   | 60  | 60  | 0  | 60  |
| V   | 40  | 80  | 80  | 0  | 120 |
| PR  | 30  | 0   | 30  | 0  | 30  |
| PG  | 0   | 0   | 0   | 0  | 0   |
| PB  | 30  | 30  | 0   | 0  | 0   |
| PRB | 0   | 70  | 70  | 0  | 70  |
| V   | 60  | 100 | 100 | 0  | 100 |
| PR  | 40  | 0   | 40  | 0  | 0   |
| PG  | 0   | 0   | 0   | 0  | 0   |
| PB  | 40  | 40  | 0   | 0  | 0   |
| PRB | 0   | 40  | 40  | 0  | 40  |
| V   | 80  | 80  | 80  | 0  | 40  |
| PR  | 50  | 20  | 50  | 20 | 0   |
| PG  | 10  | 10  | 10  | 10 | 10  |
| PB  | 50  | 50  | 20  | 20 | 20  |
| PRB | 0   | 30  | 30  | 0  | 30  |
| V   | 110 | 110 | 110 | 50 | 60  |

EXTENT OF COLOR CONSISTENCY    11a
FOR PURPLISH COLUMN

| COLOR<br>R : G : B | WHITE<br>1 : 1 : 1 | REDDISH<br>2 : 1 : 1 | BLUISH<br>1 : 1 : 2 | PURPLISH<br>2 : 1 : 2 | REDDISH PURPLE<br>3 : 1 : 2 |
|---|---|---|---|---|---|
| R<br>G<br>B | 30<br>30<br>30 | 140<br>70<br>70 | 70<br>70<br>140 | 140<br>70<br>140 | 210<br>70<br>140 |
| R<br>G<br>B | 20<br>20<br>20 | 120<br>60<br>60 | 60<br>60<br>120 | 120<br>60<br>120 | 180<br>60<br>120 |
| R<br>G<br>B | 10<br>10<br>10 | 100<br>50<br>50 | 50<br>50<br>100 | 100<br>50<br>100 | 150<br>50<br>100 |
| R<br>G<br>B | 0<br>0<br>0 | 80<br>40<br>40 | 40<br>40<br>80 | 80<br>40<br>80 | 120<br>40<br>80 |
| R<br>G<br>B | 0<br>0<br>0 | 60<br>30<br>30 | 30<br>30<br>60 | 60<br>30<br>60 | 90<br>30<br>60 |

| COLOR | BLACK | REDDISH | BLUISH | PURPLISH | REDDISH PURPLE |
|---|---|---|---|---|---|
| R : G : B | 1 : 1 : 1 | 2 : 1 : 1 | 1 : 1 : 2 | 2 : 1 : 2 | 3 : 1 : 2 |
| PR | 0 | 110 | 40 | 110 | 180 |
| PG | 0 | 40 | 40 | 40 | 40 |
| PB | 0 | 40 | 110 | 110 | 110 |
| PRB | 0 | 4900 | 4900 | 0 | 4900 |
| V | 0 | 5090 | 5090 | 260 | 5230 |
| PR | 0 | 90 | 30 | 90 | 150 |
| PG | 0 | 30 | 30 | 30 | 30 |
| PB | 0 | 30 | 90 | 90 | 90 |
| PRB | 0 | 3600 | 3600 | 0 | 3600 |
| V | 0 | 3750 | 3750 | 210 | 3870 |
| PR | 0 | 70 | 20 | 70 | 120 |
| PG | 0 | 20 | 20 | 20 | 20 |
| PB | 0 | 20 | 70 | 70 | 70 |
| PRB | 0 | 4900 | 4900 | 0 | 4900 |
| V | 0 | 5010 | 5010 | 160 | 5110 |
| PR | 0 | 50 | 10 | 50 | 90 |
| PG | 0 | 10 | 10 | 10 | 10 |
| PB | 0 | 10 | 50 | 50 | 50 |
| PRB | 0 | 1600 | 1600 | 0 | 1600 |
| V | 0 | 1670 | 1670 | 110 | 1750 |
| PR | 0 | 30 | 0 | 30 | 60 |
| PG | 0 | 0 | 0 | 0 | 0 |
| PB | 0 | 0 | 30 | 30 | 30 |
| PRB | 0 | 900 | 900 | 0 | 900 |
| V | 0 | 930 | 930 | 60 | 990 |

11a

EXTENT OF COLOR CONSISTENCY
FOR BLACK COLUMN

| | | |
|---|---|---|
| R | 0 | 30 |
| G | 0 | 30 |
| B | 0 | 30 |
| RB$^2$ | 0 | 0 |

FIG. 12

| COLOR R:G:B | WHITE 1:1:1 | | REDDISH 2:1:1 | | BLUISH 1:1:2 | | PURPLISH 2:1:2 | | REDDISH PURPLE 3:1:2 | |
|---|---|---|---|---|---|---|---|---|---|---|
| R | 250 | | 250 | | 250 | | 140 | | 210 | |
| G | 250 | | 250 | | 250 | | 70 | | 70 | |
| B | 250 | | 250 | | 250 | | 140 | | 140 | |
| R | 60 | | 120 | | 60 | | 120 | | 180 | |
| G | 60 | | 60 | | 60 | | 60 | | 60 | |
| B | 60 | | 60 | | 120 | | 120 | | 120 | |
| R | 50 | | 100 | | 50 | | 100 | | 150 | |
| G | 50 | | 50 | | 50 | | 50 | | 50 | |
| B | 50 | | 50 | | 100 | | 100 | | 100 | |
| R | 40 | | 80 | | 40 | | 80 | | 120 | |
| G | 40 | | 40 | | 40 | | 40 | | 40 | |
| B | 40 | | 40 | | 80 | | 80 | | 80 | |
| R | 30 | | 60 | | 30 | | 60 | | 90 | |
| G | 30 | | 30 | | 30 | | 30 | | 30 | |
| B | 30 | | 30 | | 60 | | 60 | | 60 | |

| COLOR<br>R : G : B | WHITE<br>1 : 1 : 1 | REDDISH<br>2 : 1 : 1 | BLUISH<br>1 : 1 : 2 | PURPLISH<br>2 : 1 : 2 | REDDISH PURPLE<br>3 : 1 : 2 |
|---|---|---|---|---|---|
| PR | — | — | — | 80 | 150 |
| PG | — | — | — | 10 | 10 |
| PB | — | — | — | 20 | 20 |
| PRB | — | — | — | 30 | 100 |
| V | — | — | — | 140 | 280 |
| PR | 0 | 60 | 0 | 60 | 120 |
| PG | 0 | 0 | 0 | 0 | 0 |
| PB | 0 | 0 | 0 | 0 | 0 |
| PRB | 30 | 90 | 0 | 30 | 90 |
| V | 30 | 150 | 0 | 90 | 210 |
| PR | 0 | 40 | 0 | 40 | 90 |
| PG | 0 | 0 | 0 | 0 | 0 |
| PB | 10 | 10 | 0 | 0 | 0 |
| PRB | 30 | 100 | 0 | 30 | 100 |
| V | 40 | 150 | 0 | 70 | 190 |
| PR | 0 | 20 | 0 | 20 | 60 |
| PG | 0 | 0 | 0 | 0 | 0 |
| PB | 20 | 20 | 0 | 0 | 0 |
| PRB | 30 | 70 | 0 | 30 | 70 |
| V | 50 | 110 | 0 | 50 | 130 |
| PR | 0 | 0 | 0 | 0 | 30 |
| PG | 0 | 0 | 0 | 0 | 0 |
| PB | 30 | 30 | 0 | 30 | 0 |
| PRB | 30 | 60 | 0 | 30 | 60 |
| V | 60 | 90 | 0 | 30 | 90 |

11a

EXTENT OF COLOR CONSISTENCY
FOR BLUISH COLUMN

| R | 30 | 60 |
| G | 30 | 60 |
| B | 60 | 120 |
| RB | -70 | -30 |

METHOD AND APPARATUS FOR TRANSFORMING COLOR IMAGE INTO MONOCHROMATIC IMAGE

BACKGROUND OF THE INVENTION

1. Field of the Invention

The present invention relates to a method of and a system for transforming a color image to a monochrome image and a recording medium with a computer program for implementing transformation of a color image to a monochrome image.

2. Description of Related Art

In an extraction process of extracting a specific part from a color image, it is important to discriminate a specific area from the color image. It is popular to recognize a specific area of an image as a partial image having even characteristic values of color density, color, texture and the like. A technique of discriminating an image area from an entire image on the basis of color components as characteristic values is widely used in various industrial fields. In, for example, a food industry or a chemical industry, the image area discrimination technique is used in image discriminating devices for position inspection of a color label on a product, devices for screening products by recognizing a color bar printed on the product or a package of the product in a combined manufacturing line, and the like.

In such a device, an image pick-up device such as a color camera is used to pick up a color image of a subject product. The color image is transmitted to an image processing device in the form of analogue signals of three primary colors of picture elements of a color image, namely R (red), G (green) and B (blue) analogue image signals, which are then converted to R, G and B digital image signals and stored in a memory. The image processing device processes the R, G and B digital signals to display a color image on a display such as a cathode ray tube (CRT). For extraction of a color in the color image, one of the colors is selected on a color pallet by a mouse pointer, or a color for extraction is designated by R, G and B brightness values through a data entry device. Otherwise a color for extraction is designated by selecting directly one or more picture elements that have the color for extraction. When a color for extraction is determined, threshold levels are established to sort out picture elements having R, G and B brightness less than the threshold levels, respectively, for consistency in color with the extracted color. Areas enclosing the picture elements that are identified as having colors regarded consistent with the extracted color are given a specific brightness value of 0 (zero) or 1 (one), and the remaining areas are given a specific brightness value of 1 (one) or 0 (zero) so as to convert the color image to binary brightness data. In an area of the color image either one of the brightness values 0 and 1 is displayed on the CRT screen. In this image discriminating technique, when picking up an image of a color label attached to a rounded subject such as a chemical tube by a camera, light rays usually impinge against the subject at an angle, so as to illuminate unevenly over the color label. As a result, the color label shows shades, which make it impossible to recognize the entire area of the color label to be consistent in color, so that extraction of the entire area of the color label is not consistent. Further, when establishing high threshold levels for R, G and B brightness values for extraction of the entire area of a color label, there is the apprehension that an unnecessary area is possibly extracted. Further, uneven illumination causes uneven brightness distribution over a subject, which results in extraction of patchy areas. When establishing high threshold levels for R, G and B brightness values for extraction of the entire area of the subject, there is also the apprehension that an unnecessary area is possibly extracted.

In order to eliminate these problems, there has been proposed a technique of discriminating an image area from an entire image in which the utilization is made of three attributes of color. Specifically, R, G and B digital image signals converted from R, G and B analogue image signals of picture elements of an image of a subject are converted to three attribute values of color, namely, values relating to hue (H), saturation (S) and brightness (I). For extraction of a color in the color image, one of colors is selected on a color pallet by a mouse pointer, or a color for extraction is designated by R, G and B brightness values through a data entry device, or otherwise, a color for extraction is designated by selecting directly one or more picture elements that have the color for extraction. When a color for extraction is determined, threshold levels are established to sort out picture elements having H, S and I values less than the threshold levels, respectively, for consistency in color with the extracted color. Areas enclosing the picture elements that are identified as having colors regarded consistent with the extracted color is extracted and displayed on a CRT screen. The color image extraction provides a precise color appraisal with components of a color tone of a subject that is not affected by uneven illumination. Such a color image extraction is known from, for example, Japanese Unexamined Patent Publication No. 4-10075.

This color image extraction disclosed by the publication has the necessity of converting R, G and B brightness values to H, S and I values, so as to make the system construction complicated and to require intricate operation, which is always undesirable for improvement of operation speed. Further, on the grounds that, when the threshold level has been established once, an extraction area is unconditionally determined, it is hard to establish a threshold level suitable for a precise extraction of a desired area.

SUMMARY OF THE INVENTION

It is therefore an object of the present invention to provide a method of and apparatus for transforming a color image to a monochrome image in which utilization is made of an extent of color consistency defined by R, G and B brightness values and at least one of brightness disparities of respective couples of two primary colors of each color picture element of a color image so as to execute high speed image processing of a color image that even includes shades or areas having uneven brightness due to uneven illumination, and to transform the color image to a monochrome image that enables an operator to make a precise extraction of a desired area from the monochrome image.

It is another object of the present invention to provide a method of and apparatus for transforming a color image to a monochrome image which make it easy to recognize an extraction area in a monochrome image and to change an extraction area.

It is still another object of the present invention to provide a method of and apparatus for transforming a color image to a monochrome image which makes it possible to execute a precise extraction of black area in a monochrome image.

It is a further object of the present invention to provide a record medium which bears a program for causing a computer to operate an apparatus for transforming a color image to a monochrome image for establishing an extent of color consistency defined by R, G and B brightness values and at least one of brightness disparities of respective couples of two primary colors of each color picture element of a color image, executing high speed image processing of a color image that even includes shades or areas having uneven brightness due to uneven illumination, and transforming the color image to a monochrome image that enables an operator to make a precise extraction of a desired area from the monochrome image.

The foregoing objects of the present invention are accomplished by a method of transforming a color image to a monochrome image on the basis of values relating to brightness of three primary colors, namely red (R), green (G) and blue (B), of the color image which comprises the steps of: detecting R, G and B brightness of color picture elements of a color image; computing at least one of brightness disparities (R−B), (R−G) and (B−G) of respective couples of two primary colors of each color picture element; designating at least one of the color picture elements or a cluster of picture elements; defining an extent of color consistency relating to a color of the designated color picture element on the basis of the B, G and R brightness and the brightness disparity, for example (R−B), of the designated color picture element; determining R, G and B brightness values and a brightness disparity (R−B) value according to differences of the R, G and B brightness and the brightness disparity (R−B) of each color picture element from the extent of color consistency; and forming a monochrome image consisting of monochrome picture elements each of which has brightness in conformity with a total value of the R, G and B brightness values and the brightness disparity (R−B) value of the color picture element corresponding to the monochrome picture element.

A brightness value of a monochromatic picture element is set at 0 (zero) when the monochromatic picture element has a brightness disparity value smaller than a predetermined threshold brightness disparity value or at a total value of R, G and B color brightness values and a value relating to the brightness disparity value when the monochromatic picture element has a brightness disparity value greater than the predetermined brightness disparity threshold value. A monochrome picture element may be given a predetermined brightness value when the monochromatic picture element has B, G and R brightness values greater than three predetermined primary color brightness threshold values, respectively.

According to another embodiment of the present invention, the method of transforming a color image to a monochrome image comprises the steps of: detecting R, G and B brightness of color picture elements of a color image; computing at least one of brightness disparities (R−B), (R−G) and (B−G) of respective couples of two primary colors of each color picture element; designating an area of the color image; defining an extent of color consistency on the basis of the R, G and B brightness and at least one of the brightness disparities (R−B), (R−G) and (B−G) of the color picture elements enclosed in the designated area; determining R, G and B brightness values and a brightness disparity value according to differences of the R, G and B brightness and the brightness disparity (R−B), (R−G) or (B−G) of each color picture element from the extent of color consistency; and forming a monochrome image consisting of monochrome picture elements each of which has brightness in conformity with a total value of the R, G and B brightness values and the brightness disparity (R−B), (R−G) or (B−G) value of the color picture element corresponding to the monochrome picture element.

The foregoing objects of the present invention are further accomplished by a system for transforming a color image to a monochrome image which comprises; brightness detecting means for detecting R, G and B brightness of color picture elements of a color image; area designating means for designating at least one of the color picture elements; processing means for computing at least one of brightness disparities (R−B), (R−G) and (B−G) of respective couples of two primary colors of each color picture element, defining an extent of color consistency relating to a color of the designated color picture element on the basis of the R, G and B brightness and the brightness disparity of the designated color picture element, and determining R, G and B brightness values and a brightness disparity value according to differences of the R, G and B brightness and the brightness disparity of each color picture element from the extent of color consistency; and display means for displaying a monochrome image consisting of monochrome picture elements each of which has brightness in conformity with a total value of the R, G and B brightness values and the brightness disparity (R−B), (R−G) or (B−G) value of the color picture element corresponding to the monochrome picture element.

The color image transforming system sets a brightness value of a monochromatic picture element at 0 (zero) when the monochromatic picture element has a brightness disparity value smaller than a predetermined threshold brightness disparity value, or at a total value of the R, G and B brightness values and a value relating to the brightness disparity value when the monochromatic picture element has a brightness disparity value greater than the predetermined brightness disparity threshold value. The color image transforming system may give a monochrome picture element a predetermined brightness value when the monochromatic picture element has the R, G and B brightness values greater than predetermined R, G and B brightness threshold values, respectively.

According to another embodiment of the present invention, a color image transforming system comprises: brightness detecting means for detecting R, G and B brightness values of color picture elements of a color image; area designating means for designating an area of the color image; processing means for computing at least one of brightness disparities R−B, R−G and B−G (which are hereafter referred to as RB, RG and BG brightness disparities) of respective couples of two primary colors of each color picture element, defining an extent of color consistency on the basis of the R, G and B brightness and the RB, RG or BG brightness disparities of the color picture elements enclosed in the designated area, and determining R, G and B brightness values and a RB, RG or BG brightness disparity according to differences of the R, G and B brightness and the RB, RG or BG brightness disparity of each color picture element from the extent of color consistency; and display means for displaying a monochrome image consisting of monochrome picture elements each of which has brightness in conformity with a total value of the R, G and B brightness values and the RB, RG or BG brightness disparity of the color picture element corresponding to the monochrome picture element.

In the above embodiments, the extent of color consistency may be established so as to enclose the color of the designated color picture element. Otherwise, the extent of color consistency may be defined within an extent of color enclosing the color of the designated color picture element.

The foregoing object of the present invention is accomplished by a record medium with a program which a computer reads out to operate to implement a transformation of a color image to a monochrome image on the basis of R, G and B brightness values and which comprises a program code for computation of at least one of RB, RG and BG brightness disparities of respective couples of two primary colors of each of color picture elements of a color image, a program code for defining an extent of color consistency relating to a color of a designated color picture element of the color image on the basis of the R, G and B brightness values and the RB, RG or BG brightness disparity of the designated color picture element, a program code for determining R, G and B attributive values and at least one of RB, RG and BG attributive values according to deviations of the R, G and B brightness values and the RB, RG or BG brightness disparity of each color picture element from the extent of color consistency, and a program code for computing a total of the R, G and B brightness values and the RB, RG or BG brightness disparity of each color picture element as a picture element attributive value in conformity with which brightness of each monochrome picture element of a monochrome image is determined.

With the color image transforming method and system, and the utilization of at least one of the RB, RG and BG brightness disparities in addition to R, G and B brightness values as parameters for a color extraction, an image of a subject that even has shades or is unevenly illuminated is transformed to a monochrome image from which a desired area is precisely extracted. A monochrome image is not limited to a multi-gradation black and white image and may be a mono-color image such as a red image that has only one attribute value such as, for example, a deviation of a brightness value from the extent of color consistency. The extent of color consistency is not limited to one that is defined between upper and lower extreme brightness values and may be defined by a single brightness value.

In the color image transforming method and system, complicated image processing such as HIS conversion is not used but only brightness disparities are computed as values relating to R, G and B brightness, so that, while the color image transforming method and system are simple in structure, they realize improvement of operation speed. Because the monochrome image has brightness which changes with a difference from a color that is designated, an area including a color for extraction is easily visually recognizable and an extraction area can be easily changeable. Moreover, the monochrome image has brightness which becomes large with a difference from an extent of color consistency that is more strict than an extent of color consistency enclosing a designated color. Accordingly, there are colors that fall within the extent of color consistency enclosing the designated color, one of which is close to a color at the middle of the extent of color consistency and another one of which is close to a peripheral color of the extent of color consistency. These colors can be weighted for an image display by establishing the strict extent of color consistency. Accordingly, picture elements having some colors that fall within the extent of color consistency are displayed with different colors, which makes an extraction of area more precise.

When extracting, for example, only characters from a subject of which a half area is white and another half area is green with the black characters, a monochrome image transformed by the conventional image transforming method shows a clear contrast between the white area and the black characters with a significant brightness difference, however, a monochrome image transformed by the image transforming method of the present invention shows the white area and the black characters with a small brightness difference. Specifically, a black picture element has R, G and B brightness values of zero (0), and a RB, RG or BG brightness disparity of zero (0) in consequence. On the other hand, a green picture element has a G brightness value greater than R and G brightness values, so as to have a RB, RG or BG brightness disparity greater than the block picture element. The monochrome image that shows a more clear contrast between the black character and green background is provided by emphasizing more the brightness disparity with a squared disparity, which provides a far more precise extraction of characters.

In the color image transforming method and system which establishes predetermined R, G and B brightness threshold values, respectively, so as to give a monochrome picture element a predetermined brightness value when the monochrome picture element has R, G and B brightness values greater than the predetermined R, G and B brightness threshold values, an image of a subject having an uneven and highly reflective surface and possibly containing highlighted white areas for parts of the subject which are practically not white, a precise extraction of a specific color of area of the subject is realized.

BRIEF DESCRIPTION OF THE DRAWINGS

The foregoing and other objects and features will be more clearly understood from the following detailed description in connection with preferred embodiments thereof when read in conjunction with the accompanying drawings, in which:

FIG. 2 is a chart showing a brightness value distribution of a color image of a subject that is evenly illuminated;

FIG. 3 is a chart showing brightness value distribution of a color image of a subject that is unevenly illuminated;

FIG. 5 is a chart showing an attributive value distribution of a monochrome image transformed from the color image shown in FIG. 3 by the color image transforming control according to the first preferred embodiment of the present invention;

FIG. 6 is a chart showing a brightness value distribution of a monochrome image transformed from a color image by a conventional color image transforming system;

FIG. 7 is a chart showing an attributive value distribution of a monochrome image transformed from the color image having the brightness value distribution shown in FIG. 3;

FIG. 9 is a chart showing an attributive value distribution of a monochrome image transformed from the color image having the brightness value distribution shown in FIG. 3 by the color image transforming control according to the second preferred embodiment of the present invention;

FIG. 10 is a chart showing a brightness value distribution of a color image of a subject that is unevenly illuminated;

FIG. 11 is a chart showing an attributive value distribution of a monochrome image transformed from the color image shown in FIG. 10 by color image transforming control according to the third preferred embodiment of the present invention;

FIG. 12 is a chart showing a brightness value distribution of a color image of a subject that is unevenly illuminated; and FIG. 13 is a chart showing an attributive value distribution of a monochrome image modified from the color image shown in FIG. 12 by color image transforming control according to the fourth preferred embodiment of the present invention.

DETAILED DESCRIPTION OF THE PREFERRED EMBODIMENTS

Figure 1:
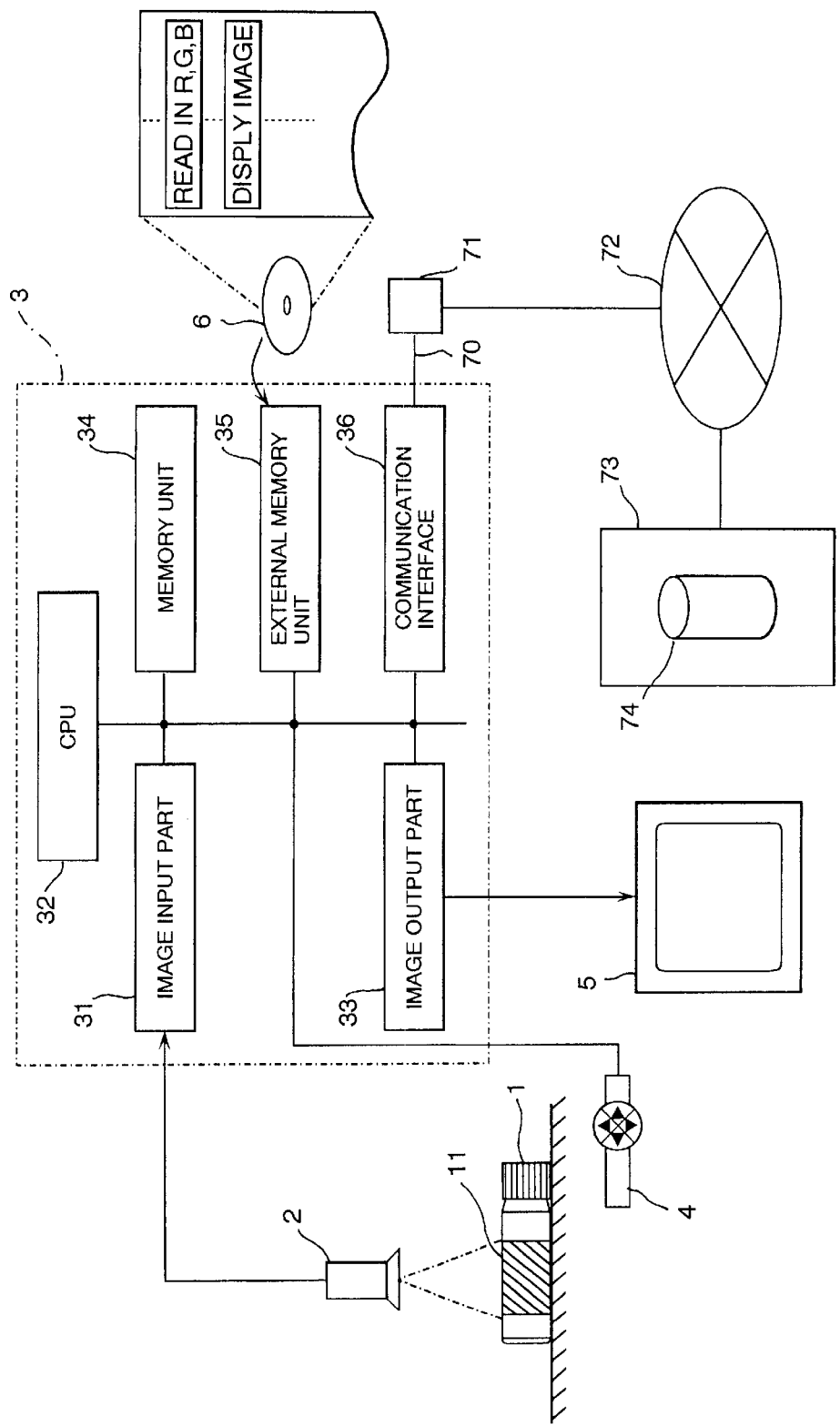
FIG. 1 is a block diagram illustrating a color image transforming system in accordance with a preferred embodiment of the present invention.

Referring to the drawings in detail, and, more particular, to FIG. 1 which shows an image transformation system for transforming a color image into a monochrome image in accordance with a preferred embodiment of the present invention that is depicted as applied to a subject discrimination system for discriminating a work 1 such as a chemical tube with a color label 11 adhered thereto placed in a manufacturing line by way of example, the image transforming device 3 is connected to external equipment including an image pickup device such as a color camera 2 for taking a picture of the work 1. An image area designating means 4 is provided for designating an area whose image is to be transformed, and an image or picture display 5 such as a cathode ray tube (CRT) is provided on which an original image and/or a partly transformed image of the work 1 are displayed. The image transforming device 3 includes an image input part 31 such as comprising an A/D converter, CPU 32 as a processor, an external memory unit 35 such as comprising a CD-ROM drive or a flexible disk drive that reads in an image transforming program from a transportable recording medium 6 such as CD-ROM or a flexible disk, a memory unit 34 for storage of information provided by CPU 32 and the program that is read out from the external memory unit 35, an image output part 33 such as comprising a D/A converter, and a communication interface 36. The image transforming device 3 is connected to a communication network 70 through the data communication interface 36 and further to an external communication network 72 such as an internet through a connecting unit 71 such as a router connected to the communication network 70. In place of reading in the image transforming program in the memory unit 34 from the transportable recording medium 6, reading may be done by an external server computer 73 through the external network 72 in conjunction with a down-load of an image transforming program stored in a recording medium 74 of the external server computer 73. Radio communication such as wireless data communication or infrared data communication may be used to implement communication through the communication network 70 as well as cable data transmission.

Analogue image data of a work 1 that is provided by the color camera 2 is decomposed into analogue signals of three primary color brightness, namely R (red), G (green) and B (blue) signals, for each picture element and transmitted to the image input part 31. The image input part 31 converts the R, G and B signals into digital signals representative of the primary color brightness values, and transmits them into CPU 32 for storage in the memory unit 34 and also to the image output part 33 for D-A conversion. The image output part 33 converts the R, G and B digital signals to R, G and B analogue signals and transmits the R, G and B analogue signals to display an image of the work 1 on a monitor screen 5. The monitor screen 5 displays a pointer (not shown) which is movable within a specified area on the monitor screen 5 to point at least one picture element of the image, practically a cluster of picture elements, by means of a locator 4. The image transforming device 3 defines R, G and B brightness of the picture element cluster of the image that is pointed by the pointer as having brightness values of zero (0) and expresses those of other picture elements of the image graded in 255 brightness values according to brightness levels so as to display a monochrome image of the label 11 of the subject work 1 on the monitor screen 5.

FIG. 2 is a chart illustrating R, G and B brightness value distribution of the color label 11 of a work 1 that is illuminated by light rays in a direction perpendicular to a plane on which the work 1 is placed. The color label 11 is provided with five longitudinal rectangular bars having different colors which extend along the circumference of the work 1. As schematically illustrated for simplicity in FIGS. 2 and 3, the five color bars are formed such as to divide a subject area 11a of the color label 11 that is monitored by the color camera 2 into five equal parts in the transverse direction. Specifically, the five color bars have different colors, namely, for example, white, a color tinted with red (which is hereafter referred to as a reddish color), a color tinted with blue (which is hereafter referred to as a bluish color), a color tinted with purple (which is hereafter referred to as a purplish color), and a color tinted with reddish purple (which is hereafter referred to as reddish purple), in order from the left. Each color bar has even brightness over the entire length.

FIG. 3 is a chart illustrating R, G and B brightness value distribution of the color label 11 of a work 1 that is illuminated by light rays in a direction at an angle relative to the plane on which the work 1 is placed. In this case each color bar has five gradations in brightness over the entire length. That is to say, the subject area 11a of the color label 11 has a 5×5 color matrix, each cell of the color matrix comprising a cluster of a specified number of picture elements having the same or approximately the same R, G and B brightness values as shown in FIG. 3.

When selecting or designating one cluster of picture elements of an image of the color label 11 displayed on the monitor screen 5, the image transforming device 3 establishes an extent of color consistency on the basis of the R, G and B brightness values of the designated picture element cluster. Parameters that are used for color identification include R, G and B brightness values and a brightness disparity of R brightness value from a brightness value of B (which is hereafter referred to as an RB brightness disparity). An extent of color that is determined between the maximum and minimum brightness values of each parameter of a color bar (each color bar displayed on the monitor screen 5 is referred to as a color column) containing the designated picture element cluster is referred to as an extent of color consistency. For example, when designating one of picture element clusters included in a color column having a bluish color at the middle on the monitor screen 5, the extent of color consistency is defined by upper and lower brightness values 30 and 70 for red (R), upper and lower brightness values of 30 and 70 for green (G), upper and lower brightness values 60 and 140 for blue (B) and upper and lower RB brightness disparities of −30 and −70. The number of picture elements that are included in one cluster is not limited to plural but may be one. If designating only one picture element, the maximum and minimum values of each of R, G and B brightness values and an RB brightness disparity of the designated picture element are used as they are to define the extent of color consistency. However, if designating a plurality of picture elements in one cluster, the maximum and minimum brightness values among a plurality of brightness values of each of R, G and B brightness values and RB brightness disparity are used. The extent of color consistency of each parameter may be determined so as to be greater than a specified breadth by adding a specified value to each of the parameters. Further, one to three parameters, besides R, G and B brightness values may be used for color identification. The greater the number of parameters is, the more accurate the color identification for transformation to a monochrome image is.

Figure 4A:
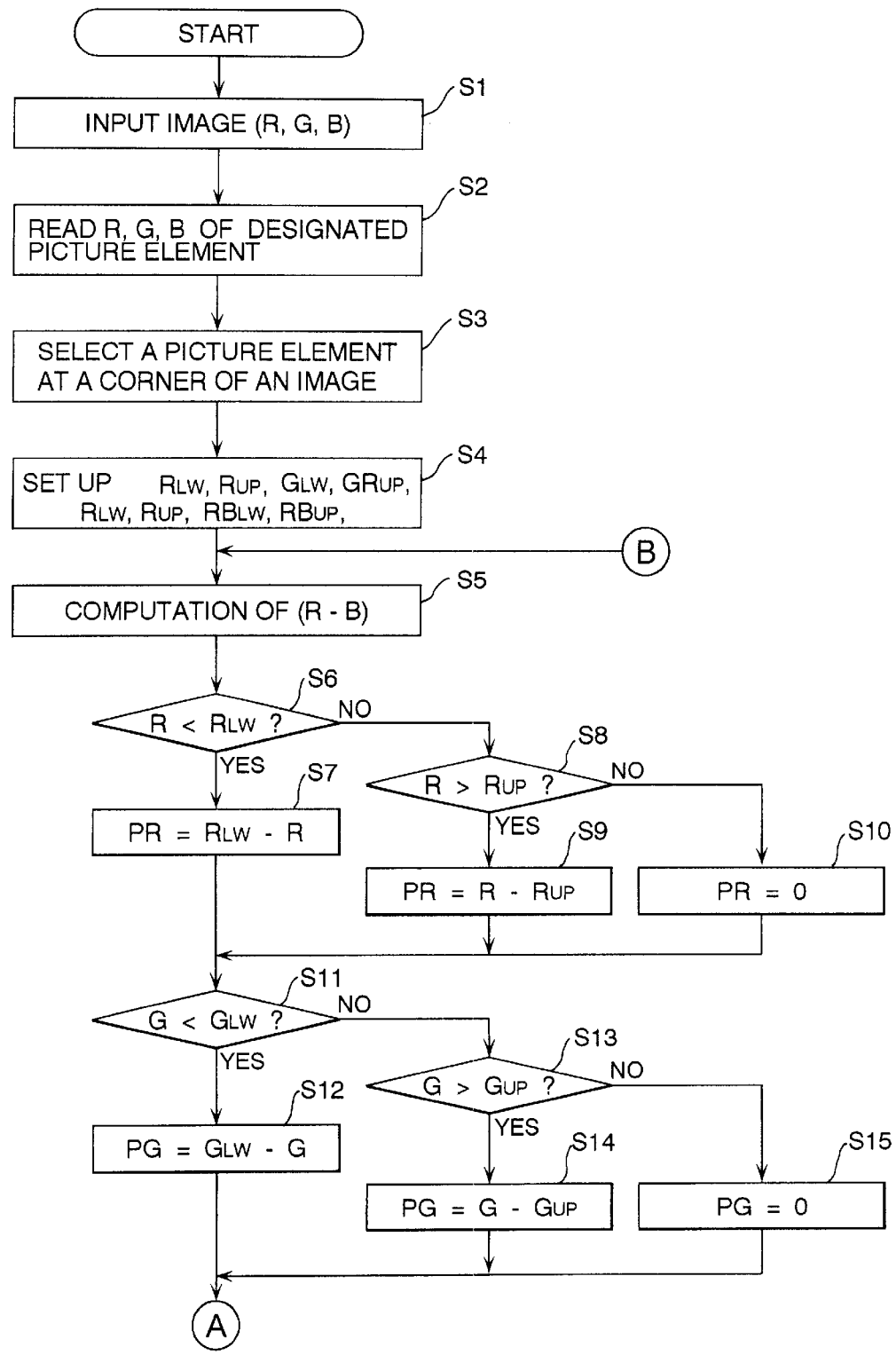
FIGS. 4A and 4B are first and second respective parts of a flow chart illustrating a sequence routine of color image transforming control according to a first preferred embodiment of the present invention.
Figure 4B:
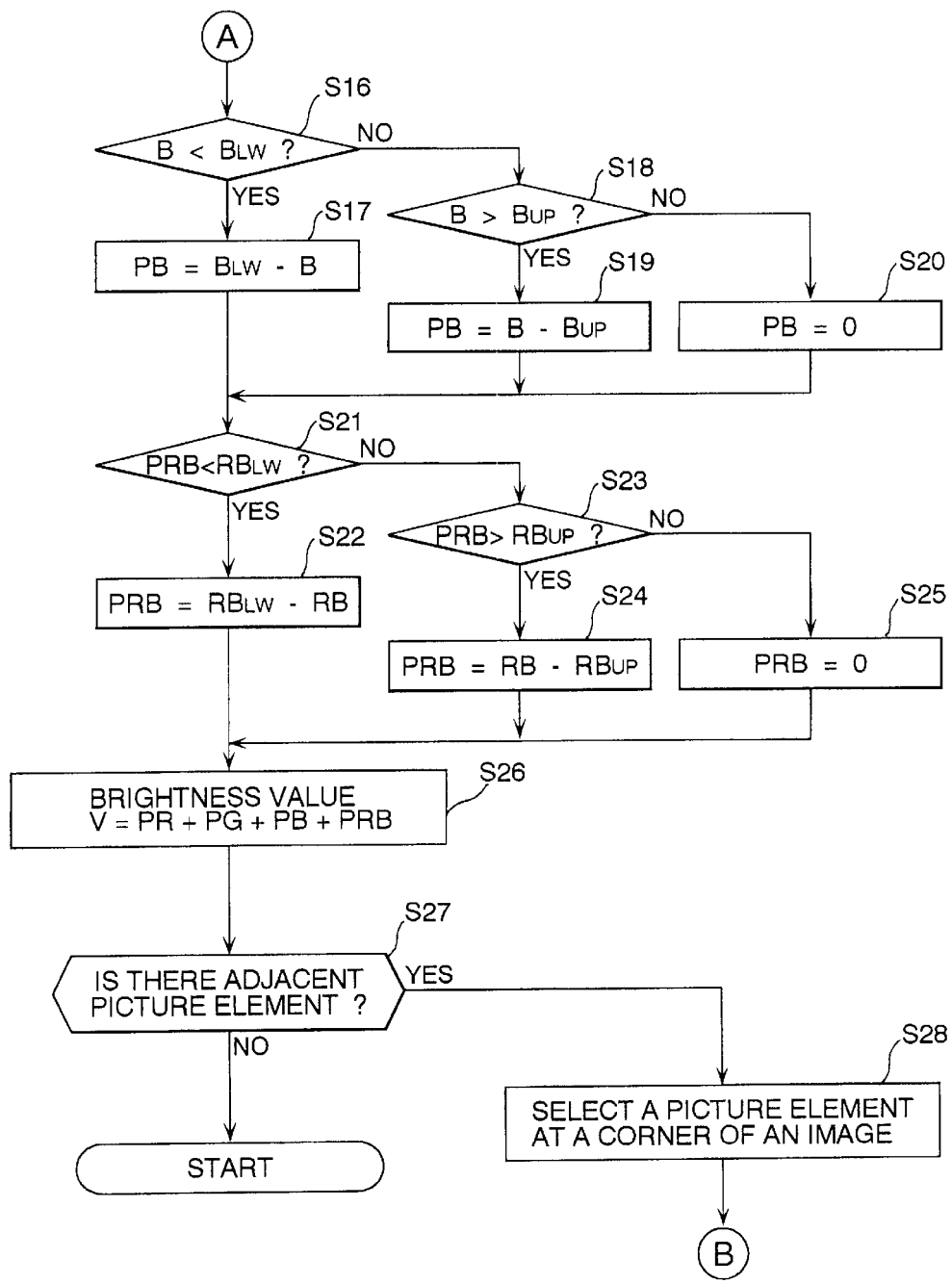

The operation of the image transforming device 3 depicted in FIG. 1 is best understood by reviewing FIGS. 4A and 4B which are a flow chart illustrating a sequence routine of image transforming control for a microcomputer of CPU 32. Programming a computer is a skill well understood in the art. The following description is written to enable a programmer having ordinary skill in the art to prepare an appropriate program for the microcomputer. The particular details of such program would of course depend upon the architecture of the particular computer selected.

The sequence logic starts when pointing an image of a label 11 of a work 11 within one of clusters of picture elements of the five color columns in the subject area 11a by means of the locator 4 to designate one picture element cluster of the image. When the sequence logic starts and control proceeds to a block at step S1 to read in data of R, G and B brightness of all of picture elements of the image in the subject area 11a provided by the color camera 2 through the image input part 31, the data of R, G and B brightness in the form of brightness values is stored in the memory unit 34. Subsequent to fetching data of the R, G and B brightness values of the designated picture element cluster from the memory unit 34 at step S2, lower and upper limit brightness values and brightness disparities of an extent of color consistency RLW and RUP for red (R), GLW and GUP for green (G), BLW and BUP for blue (B) and RBLW and RBUP for RB are determined at step S3. Thereafter, a picture element of the image is routinely designated as a subject picture element Spe(n) starting a picture element that is located at one of four corners of the subject area 11a at step S4, and an RB brightness disparity of the subject picture element Spe(n) is computed at step S5. Thereafter, a brightness value V of the subject picture element Spe(n) that has R, G and B brightness values R, G and B and an RB brightness disparity RB is determined through steps S6 to S26. Specifically, a decision is made at step S6 as to whether the R brightness value R is less than the lower limit brightness value RLW. When the answer to the decision is affirmative, this indicates that the R brightness value R of the subject picture element Spe(n) is lower than the lower limit brightness value RLW of the extent of color consistency, then, a deviation of the R brightness value R from the lower limit brightness value RLW is calculated and substituted for an R attributive value PR, which indicates a degree of deviation from the extent of color consistency, at step S7. On the other hand, the answer to the decision is negative, this indicates that the subject picture element Spe(n) has the R brightness value R higher than the lower limit brightness value RLW of the extent of color consistency, then another decision is made at step S8 as to whether the R brightness value R is higher than the upper limit brightness value RUP. When the answer to the decision is affirmative, this indicates that the subject picture element Spe(n) has the R brightness value R higher than the upper limit brightness value RUP of the extent of color consistency, then, a deviation of the R brightness value R from the upper limit brightness value RUP is calculated and substituted for an R attributive value PR which indicates a degree of deviation from the extent of color consistency at step S9. Otherwise, a value of zero (0) is substituted for the R attributive value PR at step S10. After substitution for the R attributive value PR at step S7, S9 or S10, the substantially similar sequence logic is implemented for G brightness value of the subject picture element. Spe(n) Specifically, a decision is made at step S16 as to whether the G brightness value G is less than the lower limit brightness value GLW. When the answer to the decision is affirmative, this indicates that the subject picture element Spe(n) has the G brightness value G lower than the lower limit brightness value GLW of the extent of color consistency, then, a deviation of the G brightness value G from the lower limit brightness value GLW is calculated and substituted for a G attributive value PG, which indicates a degree of deviation from the extent of color consistency, at step S12. On the other hand, when the answer to the decision is negative, this indicates that the subject picture element Spe(n) has the G brightness value G higher than the lower limit brightness value GLW of the extent of color consistency, then another decision is made at step S13 as to whether the G brightness value G is higher than the upper limit brightness value GUP. When the answer to the decision is affirmative, this indicates that the subject picture element Spe(n) has the G brightness value G higher than the upper limit brightness value GUP of the extent of color consistency, then, a deviation of the G brightness value G from the upper limit brightness value GUP is calculated and substituted for the G attributive value PG which indicates a degree of deviation from the extent of color consistency at step S14. Otherwise, a value of zero (0) is substituted for the G attributive value PG at step S15. After substitution as the G attributive value PG at step S12, S14 or S15, the substantially similar sequence logic is implemented for B brightness value of the subject picture element Spe(n). Specifically, a decision is made at step S16 as to whether the B brightness value B is less than the lower limit brightness value BLW. When the answer to the decision is affirmative, this indicates that the subject picture element Spe(n) has the B brightness value B lower than the lower limit brightness value BLW of the extent of color consistency, then, a deviation of the B brightness value B from the lower limit brightness value BLW is calculated and substituted for a B attributive value PB which indicates a degree of deviation from the extent of color consistency at step S17. On the other hand, when the answer to the decision is negative, this indicates that the subject picture element Spe(n) has the B brightness value B higher than the lower limit brightness value BLW of the extent of color consistency, then another decision is made at step S18 as to whether the B brightness value B is higher than the upper limit brightness value BUP. When the answer to the decision is affirmative, this indicates that the subject picture element Spe(n) has the B brightness value B higher than the upper limit brightness value BUP of the extent of color consistency, then, a deviation of the B brightness value B from the upper limit brightness value BUP is calculated and substituted for the B attributive value PB which indicates a degree of deviation from the extent of color consistency at step S19. Otherwise, a value of zero (0) is substituted for the B attributive value PB at step S20. After substitution for the B attributive value PB at step S17, S19 or S20, the substantially similar sequence logic is implemented for RB brightness disparity of the subject picture element Spe(n). Specifically, a decision is made at step S21 as to whether the RB brightness disparity RB is less than the lower limit brightness disparity RBLW. When the answer to the decision is affirmative, this indicates that the subject picture element Spe(n) has the RB brightness disparity RB lower than the lower limit brightness disparity RBLW of the extent of color consistency, then, a deviation of the RB brightness disparity RB from the lower limit brightness disparity RBLW is calculated and substituted for an RB attributive value PRB which indicates a degree of deviation from the extent of color consistency at step S22. On the other hand, when the answer to the decision is negative, this indicates that the subject picture element Spe(n) has the RB brightness disparity RB higher than the lower limit brightness disparity RBLW of the extent of color consistency, then another decision is made at step S23 as to whether the RB brightness disparity RB is higher than the upper limit brightness disparity RBUP. When the answer to the decision is affirmative, this indicates that the subject picture element Spe(n) has the RB brightness disparity RB higher than the upper limit brightness disparity RBUP of the extent of color consistency, then, a deviation of the RB brightness disparity RB from the upper limit brightness disparity RBUP is calculated and substituted for the RB attributive value PRB which indicates a degree of deviation from the extent of color consistency at step S24. Otherwise, a value of zero (0) is substituted for the RB attributive value PRB at step S25. After substitution for the RB attributive value PRB at step S22, S24 or S25, a picture element attributive value V of the subject picture element Spe(n) is determined by summing up the R, G, B and RB attributive values PR, PG, PB and PRB, and the data of the picture element attributive value VSpe(n) of the subject picture element Spe(n) is stored in the memory unit 34 at step S26. A brightness value of 255 is applied to all picture elements that have brightness levels higher than a brightness level in conformity with a brightness value of 255.

Thereafter, a decision is made at step S27 as to whether there is a picture element Spe(n+1) adjacent to the subject picture element Spe(n) in a vertical or transverse direction. When the answer to the decision is affirmative, after assigning the picture element Spe(n+1) adjacent to the subject picture element Spe(n) as a new subject picture element Spe(n) at step S28, the sequence logic repeats steps S5 through S28 to determine a picture element attributive value V of the new subject picture element Spe(n) until no picture element adjacent to the subject picture element Spe(n) is left. The picture element attributive values V for all picture elements of the five color columns are determined, the microcomputer is powered off to end the image transforming control. The picture element attributive values V of all picture elements of an image of the subject area 11a of a color label 11 are fetched from the memory unit 34 to display a monochrome image of the subject area 11a of the color label 11 in 255 gradations on the display 5 through the an image output part 33.

FIG. 5 shows monochrome columns to which mono-color columns of the color label 11 are transformed by the image transforming device 3 by way of example. When designating one of five picture element clusters of a bluish column that has relatively high B brightness values and approximately the same color over the entire column in order to transform the bluish column to a monochrome column, the extent of color consistency is defined between R brightness values of 30 and 70, between G brightness values of 30 and 70, between B brightness values of 60 and 140, and between RB brightness disparities of −30 and −70. As apparent in FIG. 5, a picture element cluster that has R, G and B brightness values and an RB brightness disparity all of which fall under the extent of color consistency is always present in the bluish column only. In consequence, since only the bluish column can be regarded as having the same color along the entire length, all picture elements are assigned with R, G and B brightness values and RB brightness disparity of a value zero (0). Mono-color columns other than the bluish column are shown as having a picture element attributive value V represented by the total of R, G, B and RB attributive values PR, PG, PB and PRB which are rightness disparities from the extent of color consistency. For example, R, G, B and RB attributive values PR, PG, PB and PRB of the top area of the white column are 0, 0, 0 and 30, respectively, relative to the extent of color consistency. The total of the attributive values, i.e. the picture element attributive value V, which is 30, indicates the degree of inconsistency of color with respect to the bluish column. The same processing is implemented for all of picture elements or all of picture element clusters. As a result, two picture element clusters which are different in color on an original image are displayed with the same brightness on the display 5 as long as they have the same degree of inconsistency of color. The monochrome image defined as having picture element attributive values thus determined may be displayed as a multi-gradation black and white image or as a multi-gradation mono-color image.

FIG. 6 shows a monochrome image transformed by a conventional image transforming device. In the case where, in order to make a comparison with a monochrome image transformed by the image transforming device of the present invention described above, the prior art monochrome image is evaluated with R, G and B brightness values provided in the same manner as described above, R, G and B brightness values of some parts of a white column and a purplish column falls in a color consistency extent for color identification with blue as shown in FIG. 6, so that these parts of the white and purplish columns are regarded as blue, as a result of which these parts are assigned with R, G and B attributive values of zero (0). If setting more strict R, G and B threshold values in order to eliminate such failure color identification, it is impossible to regard the entire area of the bluish column as identical in color.

In place of B, G and R brightness values as parameters, values of three primary attributes of color, namely hue (H value), color saturation (S value) and brightness or lightness (I value) that are obtained by conversion (HIS conversion) of B, G and R brightness, or difference of the H, S and I values, may be used for color identification. Further, although the extent of color consistency is defined by a consistency extent that is specified by maximum and minimum R, G and B brightness values and RB, BG and RG brightness disparities of an entire color area including at least one designated picture element or a designated picture element cluster in the above embodiment, it may be defined by a consistency extent that is specified by maximum and minimum R, G and B brightness values and RB, BG and RG brightness disparities of picture elements enclosed in a specific color area with a designated picture element at its middle.

As described above, in the image transforming system of the first embodiment, since colors of picture elements of an image of the subject area 11a are identified as identical with one another when R, G and B brightness values and RB brightness disparity of picture elements are fall within an extent of color consistency that is defined on the basis of R, G and B brightness values and an RB brightness disparity of at least one designated picture element or a picture element cluster, and a color image is transformed into a monochrome image with brightness varying according to color differences, the monochrome image provides easy and accurate visual recognition of an area for extraction. Moreover, employing no HIS conversion that is a relatively complicated technique but computation of one or more of RB, BG and RG brightness disparities makes it possible to utilize a simple processor with an expectation of high operation speed.

With the color image transforming method of the present invention, the identification of color consistency is implemented in the same manner for not only an image having shades but also an image of a subject that has uneven brightness distribution due to uneven illumination.

FIG. 7 shows a monochrome image transformed by the color image transforming device according to the above described embodiment of the present invention by way of another example. As shown, when designating one picture element cluster included in another color column, for example a purplish column, on the monitor screen 5, some picture element clusters in color columns other than the purplish color column are possibly identified as having colors involved in the extent of color consistency. For example, the top two picture element clusters in the white color column are identified as identical with the purplish column. In order to eliminate the possibility of an occurrence of wrong color identification, the utilization is made of a subsidiary extent of color consistency strictly defined on the basis of R, G and B brightness values of a designated picture element cluster. Specifically, the subsidiary extent of color consistency is defined by upper and lower limit brightness values RUP and RLW for red (R), upper and lower limit brightness values GUP and GLW for green (G), and upper and lower limit brightness values BUP and BLW for blue (B) and upper and lower limit brightness disparities RBUP and RBLW which are given by reducing upper limit brightness values RUP, GUP and BUP and upper limit brightness disparity RBUP of the extent of color consistency for the designated picture element cluster by specified values of, for example, 20, 10, 20 and 0, respectively, and increasing the lower brightness values RLW, GLW and BLW and lower limit brightness disparity RBLW the extent of color consistency for the designated picture element cluster by specified values of, for example, 20, 10, 20 and 0, respectively. R, G and B brightness values falling within the subsidiary extent of color consistency are regarded as having picture element attributive values of zero (0). R, G and B brightness values and RB brightness disparity out of the subsidiary extent of color consistency are represented on the basis of the total of RG, BG and RB attributive values which are deviations from the subsidiary extent of color consistency. The picture element attributive value V is defined by a total value of R, G, B and RB attributive values PR, PG, PB and PRB. A color image is transformed into a monochrome image comprising picture elements having brightness represented by the picture element attributive values V.

Figure 8A:
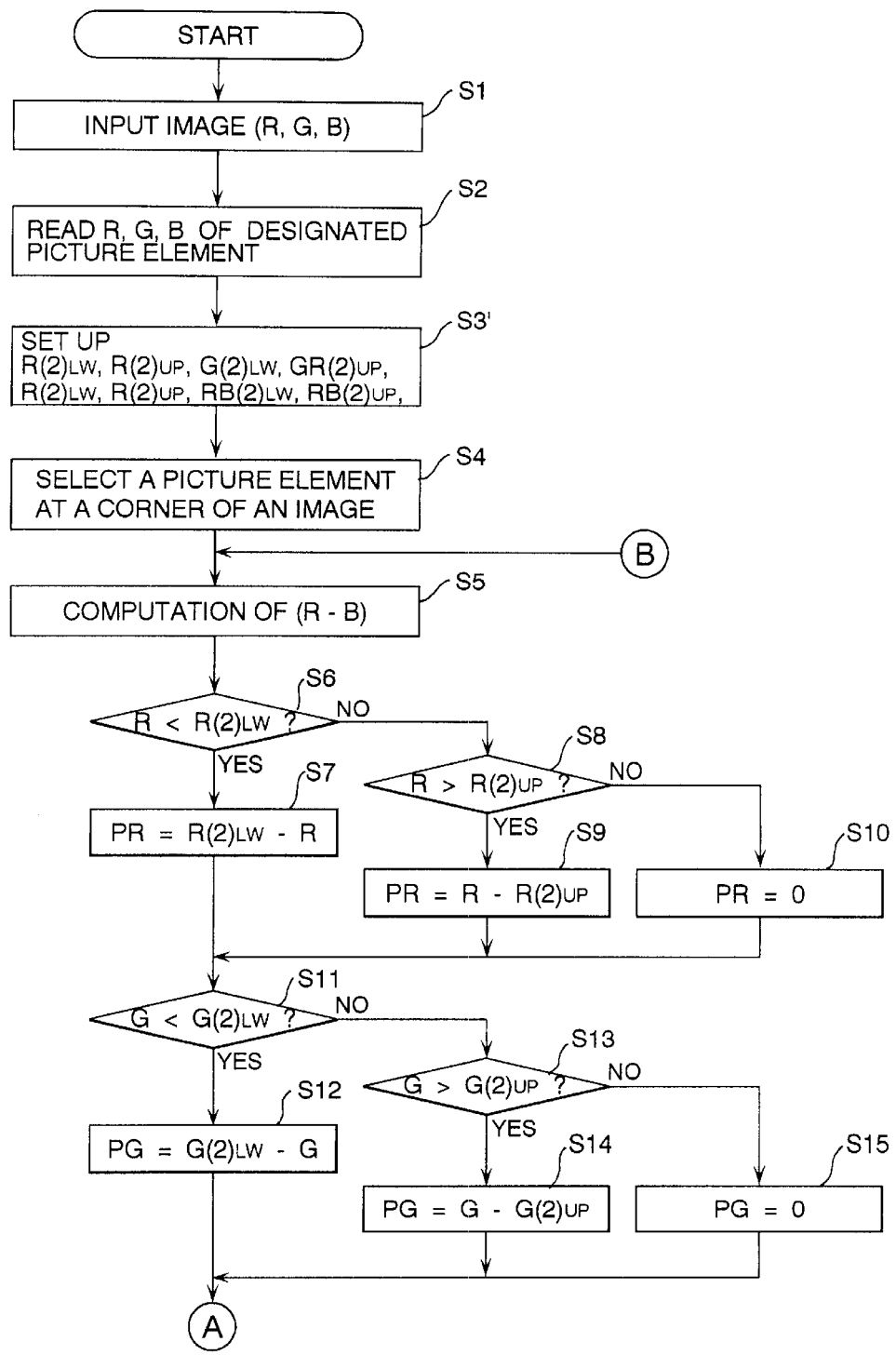
FIGS. 8A and 8B are first and second respective parts of a flow chart illustrating a sequence routine of color image transforming control according to a second preferred embodiment of the present invention.
Figure 8B:
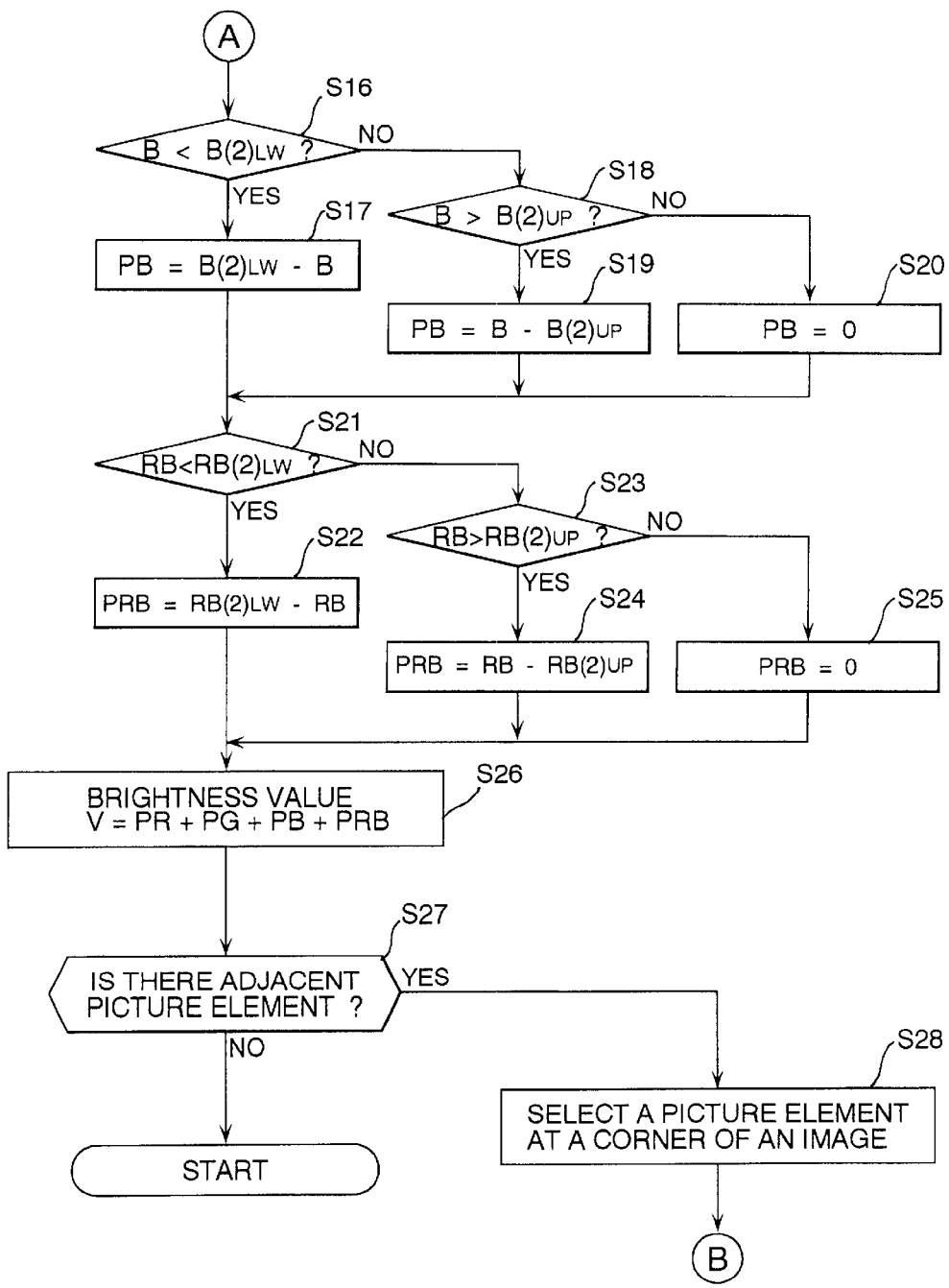

FIGS. 8A and 8B show a flow chart illustrating a sequence routine of image transforming control for a microcomputer of CPU 32 in which a strict or subsidiary extent of color consistency is used. The image transforming control sequence is similar to that illustrated by the flow chart shown in FIGS. 4A and 4B excepting that a strict extent of color consistency is defined by upper and lower limit brightness values R(2)UP and R(2)LW, upper and lower limit brightness values G(2)UP and G(2)LW, and upper and lower limit brightness values B(2)UP and B(2)LW, and upper and lower limit brightness disparities RB(2)UP and RB(2)LW at step S3'.

FIG. 9 shows a monochrome image transformed by the color image transforming control in which the strict extent of color consistency is used by way of example. As shown, as a result of utilizing the strict extent of color consistency, even a monochrome image of a color column, for example the purplish column, in which a picture element cluster is designated is displayed with gradation on the monitor screen 5.

In the case of extracting black characters printed on a work 1 colored dark, the color image transforming device 3 described above establishes brightness values of zero (0) for the dark background according to extents of color consistency. For this reason, it is preferred to use a threshold of, for example, 10 for a picture element attributive value. When a picture element cluster has a brightness disparity exceeding the threshold value, an attributive value of the picture element cluster is given by adding a square value of the brightness disparity to a total of R, G, B and RB attributive values PR, PG, PB and PRB.

FIG. 10 is a chart illustrating R, G and B brightness value distribution of a color label 11 of a work 1 that includes a black column in place of the white column of the color label shown in FIG. 3 and is illuminated by light rays in a direction at an angle relative to the plane on which the work 1 is placed. FIG. 11 shows a monochrome image transformed from the color image shown in FIG. 10. As shown in FIG. 11, because picture elements or picture element clusters in respective color columns excepting the black column have squares of RB brightness disparity as a RB attributive value which are considerably large, 255 brightness values are used for each of the reddish column, the bluish column and the reddish purple column, so that a monochrome image is formed in which the black column is easily extracted. In this instance, a picture element attributive value may be given by adding a brightness disparity multiplied specified times to a total of R, G, B and RB attributive values in place of a picture element attributive value given by a total of R, G. B and RB attributive values added by a square of the RB attributive value.

If a work 1 has a surface which has a high reflection factor and is uneven, an image possibly contains highlighted white areas of parts of the work 1 which are practically not white. In this case, it is hard to extract a picture element cluster including at least one picture element consistent in color with a designated picture element cluster, so that picture element clusters that actually have colors regarded as consistent in color with the designated picture element cluster but are displayed as highlight white picture element clusters are unsuccessful to be identified as consistent in color with the designated picture element cluster, as a result of which an area of a monochrome image is hardly visually recognizable for extraction. On this grounds, it is preferred to use another threshold for color consistency. Specifically, a picture element that has brightness exceeding the threshold is identified as falling within the extent of color consistency.

FIG. 12 is a chart illustrating R, G and B brightness value distribution of a color label 11 of a work 1 that includes black, reddish and bluish columns each of which is partly highlighted with light rays in a direction at an angle relative to the plane on which the work 1 is placed. FIG. 13 shows a monochrome image transformed from the color image of the color label 11 shown in FIG. 12. As shown in FIG. 13, when designating one of picture element clusters in the bluish column, all picture element clusters in the bluish column and highlighted picture element clusters in the black, reddish and bluish columns are identified as consistent in color with the designated picture element cluster. Further, a picture element cluster in the bluish column, a picture element cluster in the reddish column and a picture element cluster in the black column, all of which are seen white as a result of reflection of the illumination light rays, are identified as consistent in color with one another.

This color identification is implemented by processing R, G and B brightness values of picture element clusters as described below. A threshold for each primary color R, G and B is predetermined for detection of a picture element cluster whose three primary color components are reflected and separately undetectable. Picture element clusters having R, G and B brightness values exceeding the R, G and B threshold values, respectively, are identified as falling within the extent of color consistency and assigned with an attributive value of zero 0 (zero). In the color image shown in FIG. 12 by way of example, the highlighted white picture element clusters in the black, reddish and bluish columns have R, G and B brightness values of 250. When giving the R, G and B threshold values brightness values of 200, highlighted picture element clusters in the black and bluish columns are identified as consistent in color with all picture element clusters in the bluish column and transformed to monochrome picture element clusters with the same attributive values as shown in FIG. 13. Accordingly, even though highlighted picture element clusters which are recognized white and different in color from an original image are identified as consistent in color with a designated picture element cluster, extraction of the highlighted picture element clusters is never missed, so as to eliminate wrong extraction of color due to an omission of the highlighted picture element clusters .

Although one or more attributive values are obtained on the basis of RB, RG and BG brightness disparities in the above embodiments, they may be obtained on the basis of disparities relating to R, G and B brightness values, namely, for example, BR, GR and GB brightness disparities.

Although the present invention has been fully described by way of the preferred embodiments thereof with reference to the accompanying drawings, various variants and other embodiments may occur to those skilled in the relevant art. Therefore, unless otherwise such variants and other embodiments depart from the scope of the present invention, they should be construed as being covered by the following claims.

What is claimed is:

1. A method of transforming a color image to a monochrome image on the basis of values relating to brightness of three primary colors of the color image, which comprises the steps of:

detecting three primary color brightnesses of color picture elements of a color image;

computing at least one brightness disparity of a respective couple of two primary colors of each said color picture element;

designating at least one of said color picture elements;

defining an extent of color consistency relating to a color of said designated color picture element on the basis of said three primary color brightnesses and said brightness disparity of said designated color picture element;

determining three primary color brightness values and a brightness disparity value according to differences of said three primary color brightnesses and said brightness disparity of each said color picture element from said extent of color consistency;

forming a monochrome image consisting of monochrome picture elements each of which has brightness in conformity with a total value of said three primary color brightness values and said brightness disparity value of said color picture element corresponding to said monochrome picture element.

2. A method of transforming a color image to a monochrome image as defined in claim 1, wherein said extent of color consistency encloses said color of said designated color picture element.

3. A method of transforming a color image to a monochrome image as defined in claim 1, wherein said extent of color consistency is defined within an extent of color enclosing said color of said designated color picture element.

4. A method of transforming a color image to a monochrome image as defined in claim 1, wherein a brightness value of a monochromatic picture element is set at 0 (zero) when the monochromatic picture element has a brightness disparity value smaller than a predetermined threshold brightness disparity value or at a total value of said three primary color brightness values, and a value relating to said brightness disparity value when the monochromatic picture element has a brightness disparity value greater than said predetermined brightness disparity threshold value.

5. A method of transforming a color image to a monochrome image as defined in claim 1, wherein a monochrome picture element is given a predetermined brightness value when having said three primary color brightness values greater than predetermined three primary color brightness threshold values, respectively.

6. A method of transforming a color image to a monochrome image on the basis of values relating to brightness of three primary colors of the color image, which comprises the steps of:

detecting three primary color brightnesses of color picture elements of a color image;

computing at least one brightness disparity of a respective couple of two primary colors of each said color picture element;

designating an area of said color image;

defining an extent of color consistency on the basis of said three primary color brightnesses and said brightness disparity of said color picture elements enclosed in said designated area;

determining three primary color brightness values and a brightness disparity value according to differences of said three primary color brightnesses and said brightness disparity of each said color picture element from said extent of color consistency;

forming a monochrome image consisting of monochrome picture elements each of which has brightness in conformity with a total value of said three primary color brightness values and said brightness disparity value of said color picture element corresponding to said monochrome picture element.

7. A color image transforming system for transforming a color image of an object to a monochrome image on the basis of values relating to brightness of three primary colors of the color image, which comprises:

brightness detecting means for detecting three primary color brightnesses of color picture elements of a color image;

area designating means for designating at least one of said color picture elements;

processing means for computing at least one brightness disparity of respective couple of two primary colors of each said color picture element, defining an extent of color consistency relating to a color of said designated color picture element on the basis of said three primary color brightnesses and said brightness disparity of said designated color picture element, and determining three primary color brightness values and a brightness disparity value according to differences of said three primary color brightnesses and said brightness disparity of each said color picture element from said extent of color consistency; and display means for displaying a monochrome image consisting of monochrome picture elements each of which has brightness in conformity with a total value of said three primary color brightness values and said brightness disparity value of said color picture element corresponding to said monochrome picture element.

8. A color image transforming system as defined in claim 7, wherein said extent of color consistency encloses said color of said designated color picture element.

9. A color image transforming system as defined in claim 7, wherein said extent of color consistency is defined within an extent of color enclosing said color of said color picture element.

10. A color image transforming system as defined in claim 7, wherein said processing means sets a brightness value of a monochromatic picture element at 0 (zero) when said monochromatic picture element has a brightness disparity value smaller than a predetermined threshold brightness disparity value or at a total value of said three primary color brightness values and a value relating to said brightness disparity value when having a brightness disparity value greater than said predetermined brightness disparity threshold value.

11. A color image transforming system as defined in claim 7, wherein a monochrome picture element is given a predetermined brightness value when having said three primary color brightness values greater than predetermined three primary color brightness threshold values, respectively.

12. A color image transforming system for transforming a color image to a monochrome image on the basis of values relating to brightness of three primary colors of the color image, which comprises:

brightness detecting means for detecting three primary color brightnesses of color picture elements of a color image;

area designating means for designating an area of said color image;

processing means for computing at least one brightness disparity of a respective couple of two primary colors of each said color picture element, defining an extent of color consistency on the basis of said three primary color brightnesses and said brightness disparity of each said color picture element enclosed in said designated area, and determining three primary color brightness values and a brightness disparity value according to differences of said three primary color brightnesses and said brightness disparity of each said color picture element from said extent of color consistency; and display means for displaying a monochrome image consisting of monochrome picture elements each of which has brightness in conformity with a total value of said three primary color brightness values and said brightness disparity value of said color picture element corresponding to said monochrome picture element.

13. An image transforming unit for converting image signals of a color image of an object that is picked up by a color camera to image signals of a monochrome image on the basis of values relating to brightness of three primary colors of a designated area including at least one picture element of the color image and transmitting said image signal of said monochrome image to display means to display said monochrome image, said image transforming unit comprising:

image signal input means for converting R, G and B signals of picture elements of said color image from analogue signals to digital signals;

memory means for storing said digital signals of said picture elements from said image signal input means, processing means for computing at least one brightness disparity of a respective couple of two primary colors of each said color picture element, defining an extent of color consistency relating to a color of said designated color picture element on the basis of said three primary color brightnesses and said brightness disparity of said designated color picture element, and determining three primary color brightness values and a brightness disparity value according to differences of said three primary color brightnesses and said brightness disparity of each said color picture element from said extent of color consistency; and image signal output means for converting said R, G and B brightness values and said brightness disparity value from digital signals to analogue signals and transmitting said analogue signals to said display means.

14. A recording medium with a program which a computer reads out to transform a color image to a monochrome image on the basis of three primary color brightnesses, said program comprising:

a program code for computation of at least one brightness disparity of a respective couple of two primary colors of each of color picture elements of a color image;

a program code for defining an extent of color consistency relating to a color of a designated color picture element of said color image on the basis of said three primary color brightnesses and said brightness disparity of said designated color picture element;

a program code for determining three primary color brightness values and a brightness disparity value according to differences of said three primary color brightness and said brightness disparity of each said color picture element from said extent of color consistency; and a program code for computing a total value of said three primary color brightness values and said brightness disparity value of each said color picture element in conformity with which brightness of each monochrome picture element of a monochrome image is determined.

* * * * *